United States Patent
Kohlberger et al.

(10) Patent No.: US 7,954,511 B2
(45) Date of Patent: Jun. 7, 2011

(54) TWO-STAGE VALVE FOR CONTROLLING FLUIDS

(75) Inventors: Gerold Kohlberger, Rettenberg-Freidorf (DE); Guenther Schnalzger, Blaichach (DE); Ingo Buchenau, Steinheim (DE); Regine Kraft, Charleston, WV (US); Hans-Peter Bartosch, Oberstdorf (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 12/096,547

(22) PCT Filed: Nov. 15, 2006

(86) PCT No.: PCT/EP2006/068475
§ 371 (c)(1),
(2), (4) Date: Sep. 17, 2008

(87) PCT Pub. No.: WO2007/065776
PCT Pub. Date: Jun. 14, 2007

(65) Prior Publication Data
US 2009/0139588 A1  Jun. 4, 2009

(30) Foreign Application Priority Data
Dec. 8, 2005  (DE) .................. 10 2005 058 526

(51) Int. Cl.
*F16K 1/44* (2006.01)
(52) U.S. Cl. .................. 137/614.18; 137/614.17
(58) Field of Classification Search ............. 137/614.16, 137/614.18, 614.17; 251/30.04, 30.02, 129.15
See application file for complete search history.

(56) References Cited

U.S. PATENT DOCUMENTS

| | | | |
|---|---|---|---|
| 5,048,790 A * | 9/1991 | Wells | 251/30.04 |
| 5,299,775 A | 4/1994 | Kolze | |
| 5,551,664 A | 9/1996 | Boke | |
| 5,941,502 A | 8/1999 | Cooper | |
| 6,032,692 A | 3/2000 | Volz | |
| 6,443,420 B1 * | 9/2002 | Hettinger | 251/30.04 |
| 6,682,316 B1 | 1/2004 | Boeke | |
| 2003/0213928 A1 | 11/2003 | Masuda et al. | |
| 2005/0178989 A1 | 8/2005 | Stern | |

FOREIGN PATENT DOCUMENTS

| | | |
|---|---|---|
| DE | 4331568 A1 | 3/1995 |
| DE | 19529724 A1 | 2/1997 |
| DE | 29912814 U1 | 2/1999 |
| EP | 0403144 A2 | 12/1990 |
| EP | 0840048 A1 | 5/1998 |
| EP | 0997363 A2 | 5/2000 |
| EP | 1128055 A2 | 8/2001 |
| EP | 1363057 A2 | 11/2003 |
| EP | 1564467 A1 | 8/2005 |

* cited by examiner

*Primary Examiner* — Kevin L Lee
(74) *Attorney, Agent, or Firm* — Ronald E. Greigg

(57) ABSTRACT

The present invention relates to a two-stage valve for controlling fluids, in particular a hydraulic fluid. The valve includes an actuating element, a pilot stage having a first valve seat and a first closing body, which is connected to the actuating element, and a main stage having a second valve seat and a second closing body. The second closing body is provided with a fastening region and a main region having a passage opening. The first valve seat is arranged at the passage opening. The second closing body is connected to the actuating element via the fastening region. The fastening region is designed elastically in such a way as to open the pilot stage by elastically deforming during actuation of the actuating element.

12 Claims, 3 Drawing Sheets

TWO-STAGE VALVE FOR CONTROLLING FLUIDS

CROSS-REFERENCE TO RELATED APPLICATION

This application is a 35 USC 371 application of PCT/EP 2006/068475 filed on Nov. 15, 2006.

BACKGROUND OF THE INVENTION

1. Field of the Invention
2. Description of the Prior Art

The present invention relates to a two-stage fluid control valve that has an actuating element, a preliminary stage, and a main stage.

Various designs of fluid control valves are known from the prior art. Valves of this kind are used for example in supplying hydraulic pressure to wheel brakes in vehicle brake systems. An embodiment in the form of a two-stage valve with a preliminary stage and a main stage is designed to permit the opening of the valve even in the presence of powerful differential pressures. The differential pressure at the valve exerts a closing action on the valve. The opening of the preliminary stage slightly reduces the differential pressure so that the main stage can then be opened with a reduced expenditure of energy. In valves of this kind, usually spring elements are used, which have to be overcome in order to open the preliminary and/or main stage and which then automatically close the valve again after the decrease of the switching pressure. Valves of this kind, however, have a relatively large number of parts so that on the one hand, the manufacture and on the other hand, the assembly is relatively cost-intensive.

SUMMARY AND ADVANTAGES OF THE INVENTION

The two-stage fluid control valve according to the invention has the advantage over the prior art of being simply designed and very compact. In addition, it is possible to significantly reduce the number of parts of the valve according to the invention. This results in cost savings in the manufacture on the one hand and in the assembly on the other hand since there is a smaller number of parts to be assembled. Since two-stage valves of this kind are mass-produced products that are used, for example, in vehicle brake systems, this results in significant cost savings. These are achieved according to the invention by virtue of the fact that the two-stage valve includes a preliminary stage with a first valve seat and a first closure member, which is connected to an actuating element of the valve, and a main stage with a second valve seat and a second closure member. The second closure member has a fastening region and a main region with a through opening. The first valve seat in this case is situated at the through opening. Consequently, the second closure member also performs the function of the first valve seat. Furthermore, the second closure member is connected by means of its fastening region to the actuating element of the valve. In this case, the fastening region is embodied in an elastic fashion in order to open the preliminary stage through an elastic deformation of the fastening region when the actuating element is actuated. When the preliminary stage has achieved a sufficient decrease in a pressure difference between a region upstream and a region downstream of the valve, the main stage opens automatically since the elastically deformed fastening region returns to its original shape and thus executes an opening motion of the second closure member for the main stage. In the process of this, the preliminary stage is closed again and the main stage is opened. In addition, the elastic fastening region has once again assumed its original shape.

In order to permit a simple attachment of the fastening region of the second closure member to the actuating element, a detent connection is preferably provided between the fastening region and the actuating element. It is thus possible to simplify an assembly.

Preferably, the fastening region of the second closure member has a multitude of elongated attaching elements that permit a flexible deformation. In this instance, the elongated attaching elements deform for the opening of the preliminary stage and, due to their inherent elasticity, always strive to return to their original position. As soon as a corresponding pressure decrease has occurred via the opened preliminary stage, the restoring force of the attaching elements becomes greater than the differential pressure force resulting from the pressure difference so that the attaching elements return to their original shape, thereby opening the main stage and closing the preliminary stage. The fastening region preferably includes three or four elongated attaching elements, which are preferably spaced uniformly apart from one another along a circumference of the second closure member.

It is also preferable to provide an inwardly oriented projection at an outer end of the elongated attaching element. This inwardly oriented projection is part of the detent connection between the second closure member and the actuating element.

In order to enable an easy deformation of the elongated attaching elements, the inwardly oriented projection of the attaching element is provided with a surface that is inclined in relation to the movement direction of the actuating element. This inclined surface facilitates the elastic deformation, in particular the spreading open, of the attaching elements. The inclined surface here is preferably oriented at an angle of approximately 45° to the actuating direction of the actuating element.

It is also preferable for the actuating element to be provided with an annular groove that is likewise part of the detent connection. When the valve is in the closed state, the inwardly oriented projections of the elongated attaching elements are thus accommodated in the annular groove.

In order to further facilitate the spreading open and elastic deformation of the fastening region of the second closure member, the groove has a wall that is inclined in relation to the actuating direction of the actuating element. The inclination of the wall preferably corresponds to the inclination of the inclined surface on the inwardly oriented projection of the attaching element, i.e. in particular approximately 45°.

The second closure member is particularly preferably manufactured of a plastic, in particular polyamide or another thermoplastic. This permits the second closure member to be produced in a particularly inexpensive fashion. In this case, the second closure member is preferably manufactured by means of injection molding.

According to another preferred embodiment of the invention, the first closure member is integrated into the actuating element. The first closure member can, for example, be a ball that is affixed in the actuating element by being press-fitted into it. It should be noted, however, that the first closure member can also be comprised, for example, of a region of the actuating element so that the actuating element and the first closure member are provided in the form of a single part.

The two-stage valve is preferably a solenoid valve for a hydraulic brake circuit of a vehicle. The actuating element in this case is an armature of the solenoid valve. The solenoid valve is particularly preferably used as a valve in a brake control/regulation circuit, e.g. an ESP system and/or ABS system.

BRIEF DESCRIPTION OF THE DRAWINGS

A preferred exemplary embodiment of the invention will be described below with reference to the accompanying drawings.

DESCRIPTION OF THE EXEMPLARY EMBODIMENT DESCRIPTION OF THE PREFERRED EMBODIMENTS

An exemplary embodiment of a two-stage valve 1 according to the invention will be described below with reference to FIGS. 1 through 3.

Figure 1:
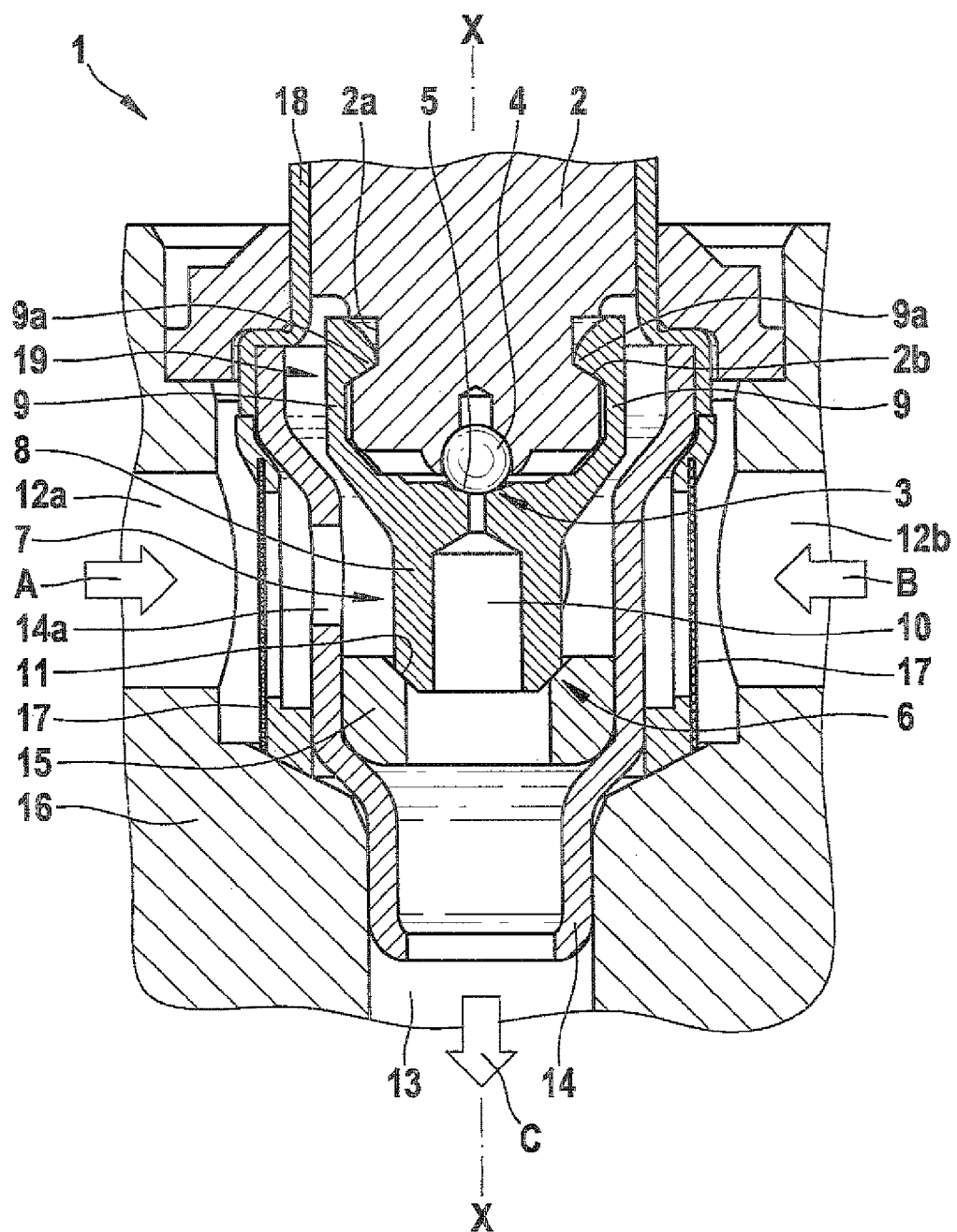
FIG. 1 is a schematic sectional view of a two-stage valve according to an exemplary embodiment of the invention, in the closed state.

As shown in FIG. 1, the two-stage valve 1 has an actuating element 2, a preliminary stage 3, and a main stage 6. The valve 1 is situated between a left supply line 12a, a right supply line 12b, and an outlet line 13. The arrows A and B show the supply direction and the arrow C shows the outlet direction.

As is clear from FIG. 1, the preliminary stage 3 is constituted by a first closure member 4 in the form of a ball and a first valve seat 5. The first closure member 4 in this case is affixed to the actuating element 2, e.g. by being press-fitted into it. The main stage 6 is provided by means of a second closure member 7 and a second valve seat 11. The second valve seat 11 is embodied on a ring 15 that is situated inside a deep-drawn part 14 that tapers in several steps. The deep-drawn part 14 has several openings 14a let into it in order to convey the supplied brake fluid into the chamber between the deep-drawn part 14 and the second closure member 7. The supply lines 12a, 12b also contain filters 17. The second closure member 7 is embodied in the form of a plastic part manufactured out of an elastomer and includes an essentially cylindrical main region 8 and a fastening region 19. As is particularly clear from FIG. 3, the fastening region 19 is composed of four elongated attaching elements 9 that each have an inwardly oriented projection 9a. The main region 8 contains a through opening 10, which has the first valve seat 5 situated at its one end. The fastening region 19 composed of the four elongated attaching elements 9 is elastically deformable; in particular, the four attaching elements 9 can be deformed radially outward so that the fastening region 19 spreads open. As is also clear from FIG. 3, an inclined surface 9b is provided on each inwardly oriented projection 9a; the inclined surfaces are inclined in relation to a movement direction X-X of the fastening element 2, preferably by an angle of approximately 45°.

As is also clear from FIG. 1, the supply lines 12a, 12b and the outlet line 13 are embodied in a housing 16. In this case, the deep-drawn part 14 is mounted in the outlet line 13. In this case, the deep-drawn part 14 is mounted in place by means of a sleeve 18, which also serves to guide the actuating element 2.

The function of the two-stage valve 1 according to the invention will be described below. When the two-stage valve 1 is to be opened in order for a pressure supplied via the supply lines 12a, 12b to be conveyed into the outlet line 13, a differential pressure prevails between the supply lines 12a, 12b and the outlet line 13. This differential pressure is relatively high so that normally, a high switching energy would be required to open the valve 1. In order to avoid this, the valve 1 is embodied as two-staged.

Figure 2:
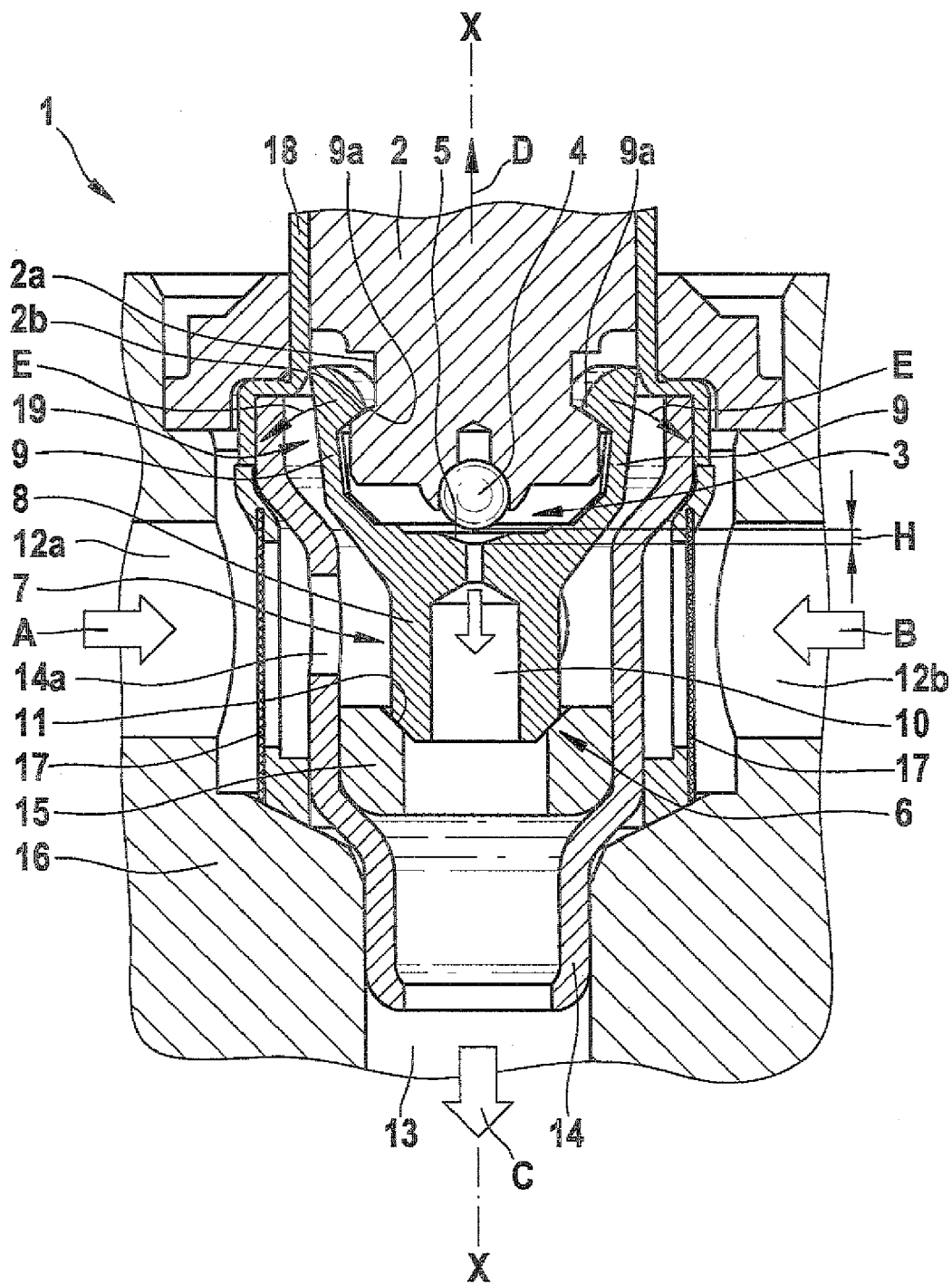
FIG. 2 is a schematic sectional view of the valve shown in FIG. 1, with an opened preliminary stage and closed main stage.
Figure 3:
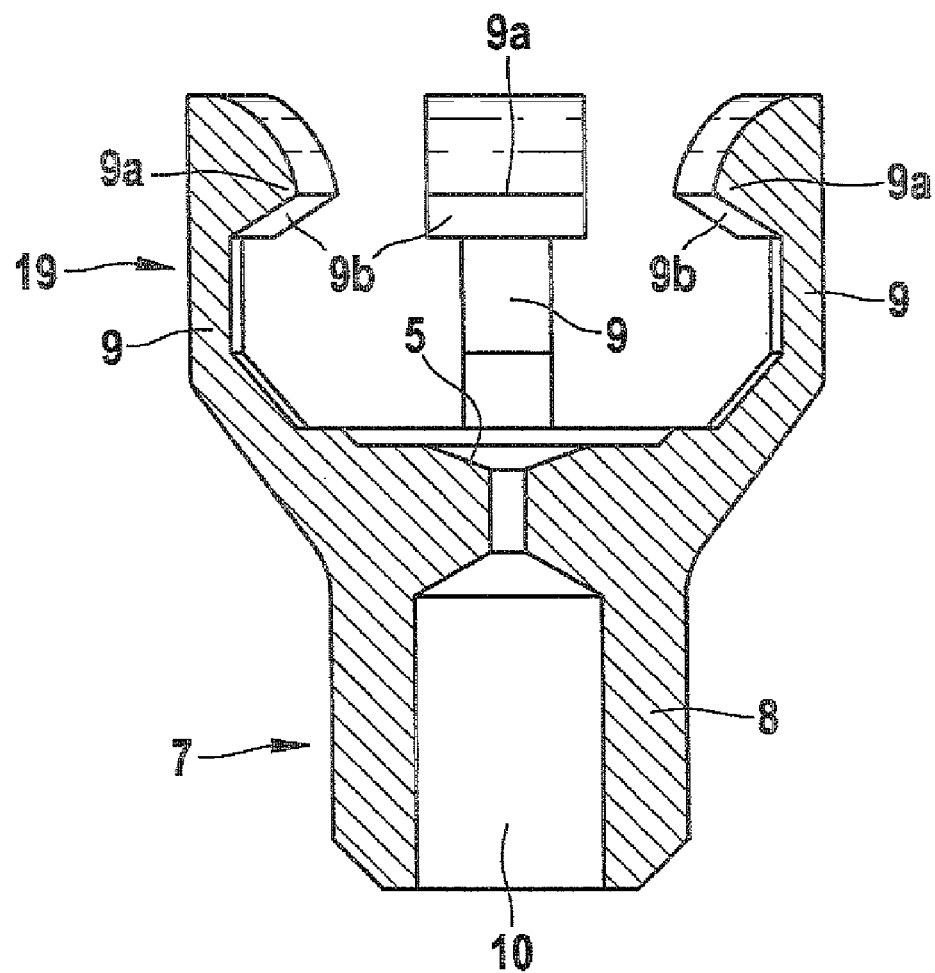
FIG. 3 is a schematic sectional view of a second closure member of the valve.

To open the valve 1, in a first step, the actuating element 2 is actuated in the direction of the arrow D (see FIG. 2). As a result, the first closure member 4 lifts away from the first valve seat 5. The stroke of the actuating element 2 and of the first closure member 4 in this case equals H (see FIG. 2). Consequently, fluid is able to flow through the opening 14a in the deep-drawn part 14, between the elongated attaching elements 9 of the fastening region 19, via the through opening 10 in the second closure member 7, and into the outlet line 13. But since the pressure difference is still very high as the preliminary stage is opened, the second closure member 7 does not move so that the main stage remains closed. However, as shown in FIG. 2, the stroke of the actuating element 2 causes the four attaching elements 9 of the fastening region 19 to spread open, which is indicated by the arrows E shown in FIG. 2. The elasticity of the fastening region 19 consequently enables the opening of the preliminary stage 3.

In the spread-open state, the fastening region 19 of the second closure member 7 always has a tendency to return to its original position shown in FIG. 1, i.e. the elongated attaching elements 9 return to their initial position. As soon as the preliminary stage 3 has achieved a corresponding reduction of the pressure difference between the region upstream and the region downstream of the valve 1, the return force of the fastening region 19 becomes greater than the holding force for the second closure member 7 generated by the pressure difference so that the fastening region 19 returns to its initial position. In the process of this, the inclined surfaces 9b of the attaching elements 9 slide along the inclined wall 2b and lift the second closure member 7 away from the second valve seat 7. The fastening region 19 is consequently once again situated in the annular groove 2a, as in the state depicted in FIG. 1; but the lifting of the second closure member 7 away from the second valve seat 11 has caused the main stage 6 to open and the preliminary stage 3 to close. Consequently, a larger volumetric flow can pass through the valve 1 via the main stage. The elasticity of the fastening region 19 therefore makes it possible according to the invention to eliminate the springs or the like that are used in the prior art to open the main stage 6 and to close the preliminary stage 3. As a result, the present invention permits a significant simplification of the design. Besides its function of actually closing the main stage 6, the second closure member 7 thus also performs the opening and closing function of the preliminary stage 3 by means of the elasticity of the fastening region 19.

If the two-stage valve is to open when there is no pressure difference between the supply lines 12a, 12b and the outlet line 13, then the fastening region 19 holds the second closure member 7 against the actuating element 2 so that the preliminary stage 3 is not opened, but instead the main stage 6 is opened immediately.

The foregoing relates to the preferred exemplary embodiment of the invention, it being understood that other variants and embodiments thereof are possible within the spirit and scope of the invention, the latter being defined by the appended claims.

The invention claimed is:

1. A two-stage valve for controlling fluids, the two-stage valve comprising:
   an actuating element;

a preliminary stage equipped with a first valve seat and a first closure member that is connected to the actuating element; and a main stage equipped with a second valve seat and a second closure member, wherein the second closure member is provided with a fastening region and a main region which is equipped with a through opening, wherein the first valve seat is disposed at the through opening, the second closure member is connected to the actuating element by means of the fastening region, the fastening region is elastic so as to open the preliminary stage by means of elastic deformation upon actuation of the actuating element, and a detent connection is disposed between the fastening region of the second closure member and the actuating element.

2. The valve according to claim 1, wherein the fastening region includes a plurality of elongated attaching elements that permit a flexible deformation.

3. The valve according to claim 2, wherein the fastening region includes three or four elongated attaching elements.

4. The valve according to claim 2, wherein an inwardly oriented projection is disposed at an outer end of the elongated attaching element.

5. The valve according to claim 3, wherein an inwardly oriented projection is disposed at an outer end of the elongated attaching element.

6. The valve according to claim 4, wherein the inwardly oriented projection of the attaching element has a surface that is inclined in relation to a movement direction of the actuating element.

7. The valve according to claim 5, wherein the inwardly oriented projection of the attaching element has a surface that is inclined in relation to a movement direction of the actuating element.

8. The valve according to claim 1, wherein an annular groove is provided in the actuating element.

9. The valve according to claim 8, wherein the annular groove has a wall that is inclined in relation to a movement direction of the actuating element and contacts a section of the fastening region.

10. The valve according to claim 1, wherein the second closure member is manufactured of a plastic, or of spring steel.

11. The valve according to claim 1, wherein the first closure member is integrated into the actuating element and is integrally joined to the actuating element.

12. The valve according to claim 1, wherein the valve is a solenoid valve for a hydraulic brake circuit of a vehicle and the actuating element is an armature of the solenoid valve.

* * * * *

UNITED STATES PATENT AND TRADEMARK OFFICE
CERTIFICATE OF CORRECTION

| | | |
|---|---|---|
| PATENT NO. | : 7,954,511 B2 | Page 1 of 1 |
| APPLICATION NO. | : 12/096547 | |
| DATED | : June 7, 2011 | |
| INVENTOR(S) | : Gerold Kohlberger et al. | |

It is certified that error appears in the above-identified patent and that said Letters Patent is hereby corrected as shown below:

On the title page, item (75), under Inventors, Line 4: Correct "WV" to "SC".

Signed and Sealed this
Ninth Day of August, 2011

David J. Kappos
*Director of the United States Patent and Trademark Office*